US011838280B2

(12) United States Patent
Falk et al.

(10) Patent No.: US 11,838,280 B2
(45) Date of Patent: *Dec. 5, 2023

(54) METHOD AND DEVICES FOR PROVIDING AT LEAST ONE SERVICE, IN PARTICULAR IN THE AUTOMOTIVE ENVIRONMENT

(71) Applicant: Siemens Aktiengesellschaft, Munich (DE)

(72) Inventors: Rainer Falk, Poing (DE); Steffen Fries, Baldham (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/874,435

(22) Filed: Jul. 27, 2022

(65) Prior Publication Data

US 2022/0368680 A1 Nov. 17, 2022

Related U.S. Application Data

(62) Division of application No. 16/463,039, filed as application No. PCT/EP2017/075587 on Oct. 9, 2017.

(30) Foreign Application Priority Data

Nov. 29, 2016 (DE) ...................... 10 2016 223 633.4

(51) Int. Cl.
*H04L 9/40* (2022.01)
*H04L 67/12* (2022.01)
(Continued)

(52) U.S. Cl.
CPC ...... *H04L 63/0428* (2013.01); *H04L 63/0218* (2013.01); *H04L 63/108* (2013.01);
(Continued)

(58) Field of Classification Search
CPC ............. H04L 63/0428; H04L 63/0218; H04L 63/108; H04L 63/166; H04L 63/168;
(Continued)

(56) References Cited

U.S. PATENT DOCUMENTS

| 2004/0210766 | A1* | 10/2004 | Kroselberg | ........... H04L 63/164 |
|---|---|---|---|---|
| | | | | 713/150 |
| 2006/0171537 | A1* | 8/2006 | Enright | ............... H04L 63/0428 |
| | | | | 380/270 |

(Continued)

FOREIGN PATENT DOCUMENTS

| CN | 102971985 A | 3/2013 |
|---|---|---|
| CN | 103379589 A | 10/2013 |

(Continued)

OTHER PUBLICATIONS http://www.itwissen.info/definition/lexikon/ISO-15118-ISO-15118. html.

(Continued)

*Primary Examiner* — Mohammed Waliullah
(74) *Attorney, Agent, or Firm* — Schmeiser, Olsen & Watts LLP

(57) ABSTRACT

A detection device which is suitable for receiving a service within a network assembly is provided, having the following: means for providing cryptographic security at or above the transport level of the communication protocol levels which can be used in the network assembly for at least one first existing communication connection between the detection device and a network access device which is arranged in the network assembly and which can be used to monitor data detected by the detection device and/or control an additional device within the network assembly using the data detected by the detection device, means for generating and/or determining network access configuration data for at least one additional second communication connection, (Continued)

which is to be cryptographically secured below the transport level, between the detection device and the network access device, means for providing the generated and/or determined network access configuration data to the network access device.

20 Claims, 1 Drawing Sheet

(51) Int. Cl.
H04W 12/08 (2021.01)
H04W 12/041 (2021.01)
H04L 67/02 (2022.01)

(52) U.S. Cl.
CPC .......... *H04L 63/166* (2013.01); *H04L 63/168* (2013.01); *H04L 67/02* (2013.01); *H04W 12/041* (2021.01); *H04W 12/08* (2013.01)

(58) Field of Classification Search
CPC ......... H04L 67/12; H04L 63/06; H04L 63/18; H04W 12/041; H04W 12/08; H04W 76/10
See application file for complete search history.

(56) References Cited

U.S. PATENT DOCUMENTS

| | | | |
|---|---|---|---|
| 2011/0239116 A1 | 9/2011 | Dill et al. | |
| 2012/0254614 A1* | 10/2012 | Kimura | H04W 12/04 713/168 |
| 2013/0038424 A1 | 2/2013 | Katar et al. | |
| 2013/0099744 A1 | 4/2013 | Falk et al. | |
| 2013/0272224 A1 | 10/2013 | Ogawara | |
| 2014/0376721 A1* | 12/2014 | Perez | H04W 12/06 380/270 |
| 2015/0189581 A1 | 7/2015 | Katar et al. | |
| 2015/0271303 A1* | 9/2015 | Neginhal | H04L 41/0876 370/392 |
| 2016/0034237 A1 | 2/2016 | Kojima et al. | |
| 2017/0237870 A1 | 8/2017 | Kojima et al. | |
| 2017/0264613 A1* | 9/2017 | Phillips | H04W 12/082 |

FOREIGN PATENT DOCUMENTS

| | | |
|---|---|---|
| CN | 105101059 A | 11/2015 |
| CN | 105323761 A | 2/2016 |
| DE | 102007030775 B3 | 2/2009 |
| JP | 2014024458 A | 2/2014 |
| JP | 2016007036 A | 1/2016 |
| WO | WO 2006078430 A2 | 7/2006 |

OTHER PUBLICATIONS https://tools.ietf.org/html/rfc5246.
https://en.wikipedia.org/wiki/Protocol_for_Carrying_Authentication_for_Network_Access).
https://tools.ietf.org/html/rfc5929.
https://de.wikipedia.org/wiki/IEEE_802.1X.
https://de.wikipedia.org/wiki/SOCKS.
PCT International Search Report of International Searching Authority dated Feb. 2, 2018 corresponding to PCT International Application No. PCT/EP2017/075587 filed Sep. 10, 2017.

* cited by examiner

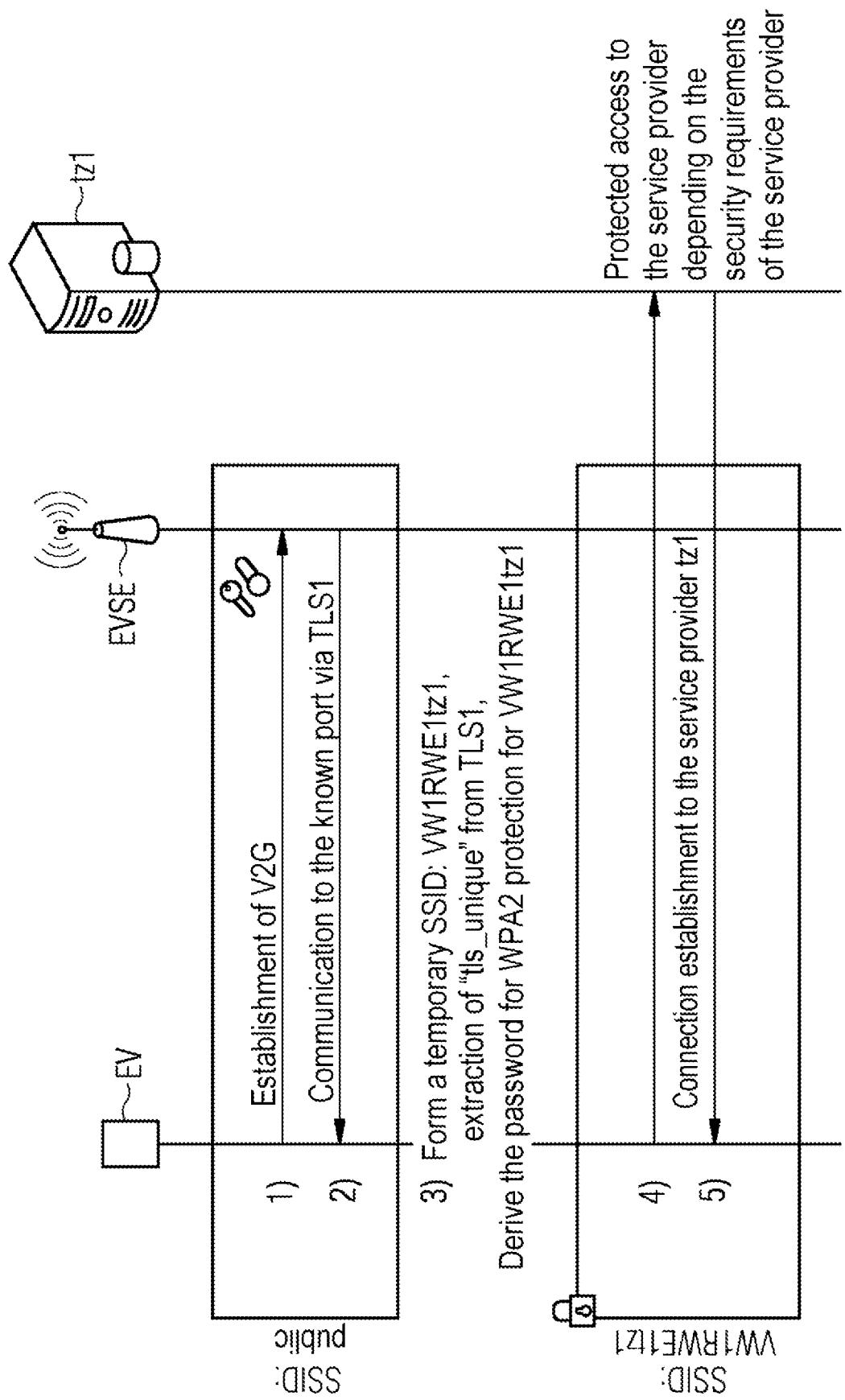

METHOD AND DEVICES FOR PROVIDING AT LEAST ONE SERVICE, IN PARTICULAR IN THE AUTOMOTIVE ENVIRONMENT

CROSS-REFERENCE TO RELATED APPLICATIONS

This application is a divisional application of U.S. application Ser. No. 16/463,039, filed May 22, 2019, and entitled "METHOD AND DEVICES FOR PROVIDING AT LEAST ONE SERVICE, IN PARTICULAR IN THE AUTOMOTIVE ENVIRONMENT", which claims priority to PCT Application No. PCT/EP2017/075587, having a filing date of Oct. 9, 2017, which is based on German Application No. 10 2016 223 633.4, having a filing date of Nov. 29, 2016, the entire contents all of which are hereby incorporated by reference.

FIELD OF TECHNOLOGY

The following relates to a method and devices for providing at least one service within a network arrangement, in particular in the automotive environment, and to an associated computer program (product).

BACKGROUND

In particular scenarios, for example in the automotive or else in the Industry 4.0 environment, it may be useful to securely relate communication connections to one another. Accordingly, a second communication connection can be permitted or established only when a first communication connection already exists or has been established between two communication partners.

In the automotive field, digital services or additional services, also called Value Added Services (VAS), may be offered, for example, at fuel pumps or charging columns if the user has already entered into a first communication relationship or connection with the fuel pump or charging column for the purpose of taking in fuel or energy.

In the Industry 4.0 environment—in a similar manner to so-called Plug and Play on a PC when connecting new hardware by loading the appropriate driver—the so-called Plug and Work of components in a technical installation is fundamentally important. In this context, it is possible to use a second communication connection bound to a first communication connection.

In this case, it is more and more important, in particular in the automotive field and also in the Industry 4.0 environment, to support the flexible choice of communication protocols. In addition, it is necessary to protect the above-mentioned second communication connection which is bound to the existing first communication connection in a tamperproof manner.

It is possible for services to be offered to users within networks via network service servers.

DE 10 2007 030 775 B3 discloses a method for filtering network services and network service contents in a network arrangement in order to implement, for example, access restrictions to websites for different user groups.

Such services play an important role, in particular, in telecommunications and on the Internet.

The following technologies are known:

The IEEE 802.1x standard provides a method for authentication and authorization in IEEE 802 networks. As a result of the possibility of using an authentication server (for example a so-called RADIUS server or DIAMETER server), network access can also be enabled for locally unknown users in this context. IEEE 802.1x-based solutions in which a client on layer 2 (level 2) of the communication protocol level used (for example OSI model or TCP/IP protocol stack) performs authentication with respect to an infrastructure component (typically a RADIUS server) which, following successful authentication, enables access for the user at a network access point (see Wikipedia): https://de.wikipedia.org/wiki/IEEE_802.1X PANA (Protocol for Carrying Authentication for Network Access) is an IP-based protocol (layer 3) which makes it possible to authenticate the user for network access (also see https://en.wikipedia.org/wiki/Protocol_for_Carrying_Authentication_for_Network_Access)

SOCKS is an Internet protocol which allows client/server applications to use the services of a proxy server transparently and in a manner independent of the protocol (see https://de.wikipedia.org/wiki/SOCKS. SOCKS itself does not provide its own protection for the communication connection but can be protected by means of existing protocols such as TLS (Transport Layer Security, see IETF RFC 5246 https://tools.ietforg/html/rfc5246).

Furthermore, it is known from IETF RFC 5246 to carry out TLS session resumption, wherein, on the one hand, a session in the closed session can be resumed up to a particular time after closing. On the other hand, it is therefore possible to multiply a further TLS session between the communication partners. In the case of this multiplication, binding to the original session is implemented.

RFC 5929 (see https:/tools.ietf.org/html/rfc5929) discloses channel binding of TLS channels. In this case, an existing TLS channel is cryptographically bound to a further channel. This channel binding is specific to each connection irrespective of whether the above-mentioned session resumption is used. TLS implementations which support the tls-unique value as a channel binding type must provide an interface to the application program which obtains channel binding for a TLS connection.

The ISO standard 15118 defines the charging control communication between a charging station and a charging control device, for example—as mentioned at the outset—of a charging control device of an electric automobile or an electric vehicle. In terms of the communication, Edition 1 of ISO 15118 focuses on Powerline Communication (PLC) and a TCP/IP protocol stack with the IP protocol and the TCP protocol (connection-oriented). In other applications, data are alternatively interchanged using the User Datagram Protocol (UDP) (connectionless). The Domain Name System (DNS) for name capture, the Transport Layer Security (TLS) for the encryption and integrity of the data on the transport layer (layer 4), the Vehicle to Grid Transport Protocol (V2GTP) and a module for smart charging are set up on the protocol stack in the application layer. In the case of the TLS protocol, the charging column must identify itself as a trusted entity with respect to the vehicle. A key is then negotiated between the communication partners and enables secure communication (see http://www.itwissen.info/definition/lexikon/ISO-15118-ISO-15118.html).

Use of the above-mentioned technologies from RFC 5246 and RFC 5929 is possible as an extension of the above-mentioned ISO standard 15118 in order to use them for wireless charging communication. Wireless charging communication is part of the second edition of ISO 15118 and consequently addresses applications in which inductive charging is also carried out.

Both RFC approaches have the disadvantage that, in order to protect the wireless communication connection between the charging control device and the charging column, the communication to the provider of additional services (VAS=Value added services) must be separately protected and an encapsulation protocol must therefore be implemented. This encapsulation makes it possible to protect the communication from hijacking by third parties.

SUMMARY

An aspect relates to improve security and protective measures in the above-mentioned context.

The embodiments claim a method for providing at least one service within a network arrangement having:
one or more capture devices and having
one or more network access devices to which one or more (of the) capture devices can be respectively coupled;
having the following steps of:
providing cryptographic security on or above the transport level of the communication protocol levels, which can be used in the network arrangement, for at least one first existing communication connection between one of the capture devices and one of the network access devices, which connection is used to monitor data captured by the capture device and/or to control a further device within the network arrangement on the basis of the data captured by the capture device,
generating and/or determining network access configuration data for at least one further, second communication connection, which is to be cryptographically protected below the transport level, between the capture device and the network access device,
providing the network access device with the generated and/or determined network access configuration data using the cryptographic security provided for the first communication connection,
setting up at least network access intended for the at least one further, second communication connection in the network access device with the aid of these provided network access configuration data,
establishing the at least one further, second communication connection between the capture device and the further network access which has been set up in the network access device with the aid of the generated and/or determined network access configuration data, wherein one or more services are provided to can be provided via this at least further, second communication connection of the capture device.

In this case, the Plug and Work is negotiated between the communication partners in the one or more first communication connection(s). One or more second communication connection(s) can be used for real-time control communication.

A communication connection can also be a communication channel or else can be established using bundled channels. Communication protocol levels are applied to communication connections, wherein at least a virtual or logical transmission connection (or channel) for data, in particular in the form of data packets, is provided between two or more communication partners on or above level 4 (transport level/layer). Known models for communication protocol levels are the OSI model and the TCP/IP protocol stack. TCP (connection-oriented) or UDP (connectionless) or the like is usually used on level 3.

One development of embodiments of the invention provides for the cryptographic protection for the first communication connection to be implemented by means of so-called TLS encryption or DTLS encryption.

The second communication connection can be bound to the first communication connection (channel binding) or may be dependent thereon.

One development of embodiments of the invention provides for the second communication connection to be terminated when the first communication connection is terminated, possibly by the network access device or possibly by the capture device. In this case, the network access configuration data may be deleted.

One development of embodiments of the invention provides for the generated and/or determined network access configuration data to comprise a public or hidden network name and/or an access key.

One development of embodiments of the invention provides for the further network access which has been set up to be temporally limited and to no longer be available after the time at which the first communication connection is terminated.

One development of embodiments of the invention provides for the generated and/or determined network access configuration data to be provided by virtue of the fact that they are transmitted by means of the first cryptographically protected communication connection or are derived from the context of the first cryptographically protected communication connection.

One development of embodiments of the invention provides for the generated and/or determined network access configuration data to comprise a public or hidden network name and/or an access key.

One development of embodiments of the invention provides for the further network access which has been set up to be temporally limited and to no longer be available after the time at which the first communication connection is terminated.

One development of embodiments of the invention provides for the one or more network access devices to permit a communication connection from the network access device to a network service server so that one or more of the services are provided by the network service server.

One development of embodiments of the invention provides for that port in the network access device which is used for the second communication connection to the capture device to be enabled for this communication connection to the network service server. The SOCKS protocol mentioned at the outset or its expansion SOCKSS can be used for this purpose.

One development of embodiments of the invention provides for the port to be enabled on the basis of the first communication connection.

One development of embodiments of the invention provides for the port to be enabled to be preconfigured or to be dynamically determined from the network access configuration data.

The embodiments are distinguished by the following advantages:

The proposed approach makes it possible to enable communication connections to service providers in a more differentiated manner via a network access device, wherein there is no restriction of the application protocol since the protection is implemented below layer 4. The proposed approach also makes it possible to enable communication connections without additional configuration data communication since the capture device and the network access device can locally calculate all parameters. In addition, automatic clearing of the second communication connection can be ensured by virtue of the binding to a first communication connection.

Another aspect of embodiments of the invention provides a capture device suitable for receiving a service within a network arrangement, having:
- means for providing cryptographic security on or above the transport level of the communication protocol levels, which can be used in the network arrangement, for at least one first existing communication connection between the capture device and a network access device arranged in the network arrangement, which connection can be used to monitor data captured by the capture device and/or to control a further device within the network arrangement on the basis of the data captured by the capture device,
- means for generating and/or determining network access configuration data for at least one further, second communication connection, which is to be cryptographically protected below the transport level, between the capture device and the network access device,
- means for providing the network access device with the generated and/or determined network access configuration data using the cryptographic security provided for the first communication connection,
- means for establishing the at least further, second communication connection between the capture device and further network access which has been set up in the network access device with the aid of the generated and/or determined network access configuration data, wherein one or more services can be provided via this further, second communication connection of the capture device.

The capture device can be designed or developed according to the embodiments/developments for the method mentioned above.

Another aspect of embodiments of the invention provides a network access device suitable for providing a service for a capture device within a network arrangement, having:
- means for using generated and/or determined network access configuration data to establish at least one second communication connection, which data have been provided using the cryptographic security provided for at least one first communication connection on or above the transport level of the communication protocol levels which can be used in the network arrangement, wherein the at least first communication connection can be used to monitor data captured by the capture device and/or to control a further device within the network arrangement on the basis of the data captured by the capture device,
- means for setting up at least further network access with the aid of these provided network access configuration data,
- means for establishing the at least further, second communication connection between the capture device and the further network access which has been set up with the aid of the provided network access configuration data, wherein one or more services can be provided via this further, second communication connection of the capture device.

The network access device can be designed or developed according to the embodiments/developments for the method mentioned above.

Another aspect of embodiments of the invention provides a network arrangement having at least one capture device according to one of the embodiments mentioned above and at least one network access device according to one of the embodiments mentioned above, to which the capture devices can be coupled, wherein the capture device and the network access device are designed to carry out a method according to one of the embodiments mentioned above.

Another aspect of embodiments of the invention is a computer program product (non-transitory computer readable storage medium having instructions, which when executed by a processor, perform actions) having at least one computer program which has means for carrying out the method according to one of the embodiments mentioned above when the at least one computer program is executed in a distributed manner within the network arrangement mentioned above.

The computer program (product) can be accordingly designed or developed substantially in a similar manner to the method and its configurations and developments.

BRIEF DESCRIPTION

Some of the embodiments will be described in detail, with references to the following FIGURES, wherein like designations denote like members, wherein:

The FIGURE schematically shows a flowchart relating to which steps or message flow can be carried out between the capture device and the network access device and possibly the network service server.

DETAILED DESCRIPTION

The FIGURE illustrates a capture device EV of a plurality of possible capture devices, which may be in the form of a charging control device in an electric automobile. The at least one first communication connection can be used to monitor data captured by the capture device and/or to control a further device within the network arrangement on the basis of the data captured by the capture device. Such a capture device generally captures measurement data, for example the state of charge of an energy store installed in the electric automobile, wherein the measurement data can be captured by means of a sensor. An actuator generally controls the charging of the energy store by means of physical actuators. A network access device EVSE of possibly a plurality of network access devices is also provided and can have a communication connection to a (network service) server tz1 of a service provider. In this case, the network access device may be part of a charging column.

It is also conceivable, in the Industry 4.0 environment, for the capture device to be integrated in a device which is not provided for the purpose of controlling an energy charging process but rather, for so-called Plug & Work, conducts real-time communication with the network access device which provides "work" configurations for the device.

In terms of the temporal sequence, a first communication connection or channel or else a plurality thereof is/are normally established first of all. The communication channel TLS1, indicated in the FIGURE by 1), from the capture device EV with the name "VW1" to the known port "RWE1" of the network access device EVSE is established or already exists. As part of the TLS connection establishment, the network access device EVSE is authenticated by means of a server certificate. In this example, the capture device EV is authenticated indirectly by means of local authentication at the network access device EVSE by the user. In the context of vehicle-to-grid (V2G) communication, the capture device EV can now request service provision or service facilitation from the network access device EVSE.

On the basis of the first established TLS connection, both sides can derive all necessary parameters for a second communication connection, for example a temporary WLAN or a temporary WLAN connection (WLAN: Wireless Local Area Network), for example with the SSID "VW1RWE1". The TLS connection may also be a DTLS connection (DTLS: Datagram TLS) if a UDP protocol is used instead of a TCP protocol. In the step indicated by 3), after deriving the parameters, the network access device EVSE provides the WLAN connection having this SSID. The necessary network key is determined by means of the derivation from the value tls unique. The capture device EV can then register in the WLAN having the SSID "VW1RWE1" on the basis of the locally determined registration data. In the step indicated by 4), the protected access to the (network service) server tz1 of the service provider depends on the security policy or the security rules of the service provider. In the step indicated by 5), the network access device can establish communication with the server of the service provider tz1.

In order to implement one or more further, second communication connections, which are bound to a first communication connection, to a network access or WLAN access point set up in the network access device, the following embodiments are possible:

A first communication connection is established, wirelessly, between a capture device, for example EV, and a network access device, for example EVSE. This network access device already provides services, for example a wireless charging service for an energy store which can be controlled by the capture device. In the Industry 4.0 environment, a first communication connection will provide a type of network access control. In this case, a configuration check is carried out with the device to be controlled in order to determine whether current software updates are installed and the virus scanner is kept up-to-date. A WLAN configuration is provided only if the configuration is identified as valid (that is to say VAS can be accessed only via WLAN if the configuration has been previously checked). It is also possible to check further parameters (for example whether urgent diagnostic data are available), for example whether the device has been manipulated (for example an engine controller). Depending on the check, a connection to one or more above-mentioned third devices which are not illustrated in the FIGURE, for example a place of repair, can be effected in order to report a manipulated device, for example.

This first communication connection can be established using the security protocol TLS "Transport Layer Security", that is to say on the transport level.

At least unilateral authentication of the server with respect to the client is carried out by means of TLS. The client, here the capture device in the example, is authenticated with respect to the server, here the network access device in the example, given by one of the following possibilities:

by means of client-side authentication in TLS (for example client certificate or so-called pre-shared key with TLSPSK)

by means of an application protocol via the existing TLS connection (for example HTTP Digest, JWT Security Token, XML Security)

directly by users on the server using a further interface, that is to say independently of the TLS connection (in the present example, this may be enabling by means of RFID or else directly a payment action which binds the client to the server).

As a result, there is a high degree of flexibility for authenticating the client or possibly also for dispensing with client authentication. Nevertheless, one or possibly more second communication connection(s) is/are intended to be securely established, which connection(s) can be uniquely assigned to the same client in a tamperproof manner. The first TLS communication connection is used to provide the client with network configuration data for protected network access (in particular a configuration for a cryptographically protected WLAN communication connection, which comprises, in particular, key material and a network name, for example an SSID, as identification information).

These network configuration data for the second communication connection are specific to this client (that is to say temporary WLAN access specific to this client is configured):

establishing a TLS communication connection between the client and the server (using unprotected first network access) (also see 1) and 2) in the FIGURE);

generating or forming and/or ascertaining or determining dynamic network access configuration data for protected network access (below layer 3, layer 2: IEEE 802.11 WLAN, Ethernet MACsec, IPsec with layer 2 tunneling). In this case, at least one parameter (PSK key, network name (SSID)) can be generated in a random or pseudo-random manner (also see 3) in the FIGURE);

configuring/setting up second temporary network access by means of the server according to the generated network access configuration data;

providing the client with the dynamic network access configuration data using the TLS connection (explicit transmission of configuration data via the TLS connection or determination of the network access configuration data on the basis of the TLS connection);

establishing second, protected network access by means of the client according to the dynamic network access configuration (see 5) in the FIGURE).

In the Industry 4.0 environment, the second communication connection can be used for real-time control communication. The negotiation with respect to Plug-and-Work takes place via the first connection.

The second network access is terminated by the server (network access which has been set up is deactivated, network configuration data are deleted) if the TLS connection used to transmit the network access configuration data is terminated. The second communication connection is terminated by the client if the TLS communication connection used for set-up is terminated. The network access which has been set up for the second communication connection is removed by the client if the TLS communication connection used for set-up is terminated.

This first communication connection can be specifically established to a determinable known port of the server via an open WLAN (own SSID, SSID itself is public). Alternatively, the address of the server or of the port can also be determined using a (service) discovery protocol (for example LLDP). In this WLAN, the server does not allow a connection to be established to external servers of a service provider. This first communication connection is used, in particular, to transmit control communication in the case of a wireless (inductive) charging operation. As already explained above, in the case of a network access control connection, the server can now generate a temporary S SID (WLAN network name) for an additional WLAN automatically or on the request of the client. This SSID may likewise be public (that is to say disclosed using so-called WLAN beacons) or may be hidden (that is to say can be checked only by means of probe requests).

The server communicates this SSID to the client via the first communication connection (for example using the TLS protocol via the first communication connection). The temporary SSID can also be established according to a defined pattern, with the result that the client can itself form this SSID. One possible approach is: temporary SSID=service name|client identifier, wherein the client identifier may be the MAC address, for example. The service name may be a known name and may correspond, for example, to the SSID of the public WLAN. The second WLAN having the temporary SSID is access-protected (WEP, WPA, WPA2 or the like). The data required for this purpose can be communicated to the client directly or, for example, using a separate protocol message via the first (secure) communication connection. The client and server can use the security association established in the first communication connection to derive the access data for the second communication connection therefrom. The known derivations from RFC 5929, for example for TLS, can be used for this purpose in order to establish a cryptographic bond to the second communication connection using the tls unique value. The client and server therefore derive the access password "pw_temp_SSID" for the WLAN having the temporary SSID from "tls_unique". A hash function such as SHA256, for example, can be used as the derivation function: pw_temp_SSID=h(tls_unique|client identifier|service name). Further parameters may be included in this derivation (here, for example, the client identifier and the service name). The client can securely connect only to the WLAN having the temporary SSID via WPA2 (or the like) and can communicate with the server of the service provider in a protected manner via the server (the end-to-end communication with the external service provider is typically protected separately). The server can restrict the number of accepted connections to the temporary WLAN.

Depending on the server security policy (security requirements), the temporary SSID is deleted and all connections are cleared as soon as the first communication connection is terminated. Alternatively, this may remain until cleared by the client explicitly or after a predefined time.

Although embodiments of the invention have been described and illustrated more specifically in detail by means of the preferred exemplary embodiment, embodiments of the invention are not restricted by the disclosed examples and other variations can be derived therefrom by a person skilled in the art without departing from the scope of protection of embodiments of the invention.

The processes or method sequences described above can be implemented on the basis of instructions available on computer-readable storage media or in volatile computer memories (referred to as computer-readable memories in summary below). Computer-readable memories are, for example, volatile memories such as caches, buffers or RAM and non-volatile memories such as removable storage devices, hard disks, etc.

The functions or steps described above may be available in this case in the form of at least one instruction set in/on a computer-readable memory. In this case, the functions or steps are not tied to a particular instruction set or to a particular form of instruction sets or to a particular storage medium or to a particular processor or to particular execution schemes and can be executed by means of software, firmware, microcode, hardware, processors, integrated circuits etc. alone or in any desired combination. In this case, a wide variety of processing strategies can be used, for example serial processing by means of an individual processor or multiprocessing or multitasking or parallel processing etc.

The instructions may be stored in local memories, but it is also possible to store the instructions on a remote system and to access them via a network.

The term "processor", "central signal processing", "control unit" or "data evaluation means" as used here, comprises processing means in the broadest sense, that is to say, for example, servers, universal processors, graphics processors, digital signal processors, application-specific integrated circuits (ASICs), programmable logic circuits such as FPGAs, discrete analog or digital circuits and any desired combinations thereof, including all other processing means known to a person skilled in the art or developed in future. In this case, processors may consist of one or more apparatuses or devices or units. If a processor consists of a plurality of apparatuses, they may be designed or configured for the parallel or sequential processing or execution of instructions.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for providing at least one service within a network arrangement comprising:
   one or more capture devices; and
   one or more network access devices to which one or more capture devices can be respectively coupled;
   the method comprising:
   providing cryptographic security on or above a transport level of communication protocol levels, which can be used in the network arrangement, for at least one first existing communication connection between one of the capture devices and one of the network access devices, which connection is used to monitor data captured by the capture device and/or to control a further device within the network arrangement on a basis of the data captured by the capture device;
   generating and/or determining network access configuration data for at least one further, second communication connection, which is to be cryptographically protected below the transport level, between the capture device and the network access device;
   providing the network access device with the generated and/or determined network access configuration data using the cryptographic security provided for the first communication connection;
   setting up at least network access intended for the at least one further, second communication connection in the network access device with the aid of the provided network access configuration data; and establishing the at least one further, second communication connection between the capture device and the further network access which has been set up in the network access device with an aid of the generated and/or determined network access configuration data, wherein one or more services can be provided via this further, second communication connection of the capture device;

wherein the second communication connection is terminated when the first communication connection is terminated.

2. The method as claimed in claim 1, wherein the cryptographic protection for the first communication connection is implemented by means of TLS encryption or DTLS encryption.

3. The method as claimed in claim 1, wherein the second communication connection is bound to the first communication connection.

4. The method as claimed in claim 1, wherein the generated and/or determined network access configuration data comprise a public or hidden network name and/or an access key.

5. The method as claimed in claim 1, wherein the further network access which has been set up is temporally limited and is no longer available after the time at which the first communication connection is terminated.

6. The method as claimed in claim 1, wherein the one or more network access devices permit a communication connection from the network access device to a network service server so that one or more of the services are provided by the network service server.

7. The method as claimed in claim 6, wherein a port in the network access device which is used for the second communication connection to the capture device is enabled for this communication connection to the network service server.

8. The method as claimed in claim 7, wherein the port is enabled on the basis of the first communication connection.

9. A capture device suitable for receiving a service within a network arrangement, comprising:
a processor configured to:
provide cryptographic security on or above a transport level of communication protocol levels, which can be used in the network arrangement, for at least one first existing communication connection between the capture device and a network access device arranged in the network arrangement, which connection can be used to monitor data captured by the capture device and/or to control a further device within the network arrangement on the basis of the data captured by the capture device;
generate and/or determine network access configuration data for at least one further, second communication connection, which is to be cryptographically protected below the transport level, between the capture device and the network access device,
provide the network access device with the generated and/or determined network access configuration data using the cryptographic security provided for the first communication connection, wherein the generated and/or determined network access configuration data are derived from a context of the first cryptographically protected communication connection; and
establish the at least further, second communication connection between the capture device and further network access which has been set up in the network access device with the aid of the generated and/or determined network access configuration data, wherein one or more services can be provided via this further, second communication connection of the capture device;
wherein the second communication connection is terminated when the first communication connection is terminated.

10. The capture device as claimed in claim 9, wherein the cryptographic protection for the first communication connection can be implemented by means of so-called TLS encryption or DTLS encryption.

11. A network access device suitable for providing a service for a capture device within a network arrangement, comprising:
a processor configured to:
generate and/or determine network access configuration data to establish at least one second communication connection, which data have been provided using the cryptographic security provided for at least one first communication connection on or above the transport level of the communication protocol levels which can be used in the network arrangement, wherein the at least first communication connection can be used to monitor data captured by the capture device and/or to control a further device within the network arrangement on the basis of the data captured by the capture device, wherein the generated and/or determined network access configuration data are derived from a context of the first cryptographically protected communication connection;
set up at least further network access with the aid of these provided network access configuration data; and
establish the at least further, second communication connection between the capture device and the further network access which has been set up with the aid of the provided network access configuration data, wherein one or more services can be provided via this further, second communication connection of the capture device;
wherein the second communication connection is terminated when the first communication connection is terminated.

12. The network access device as claimed in claim 11, wherein the further network access which has been set up is temporally limited and is no longer available after the time at which the first communication connection is terminated.

13. The network access device as claimed in claim 11, wherein the network access device allows a communication connection to a network service server so that one or more of the services can be provided by the network service server.

14. The network access device as claimed in claim 11, wherein the cryptographic protection for the first communication connection can be implemented by means of TLS encryption or DTLS encryption.

15. A capture device suitable for receiving a service within a network arrangement, comprising:
a processor configured to:
provide cryptographic security on or above a transport level of communication protocol levels, which can be used in the network arrangement, for at least one first existing communication connection between the capture device and a network access device arranged in the network arrangement, which connection can be used to monitor data captured by the capture device and/or to control a further device within the network arrangement on the basis of the data captured by the capture device;

generate and/or determine network access configuration data for at least one further, second communication connection, which is to be cryptographically protected below the transport level, between the capture device and the network access device, provide the network access device with the generated and/or determined network access configuration data using the cryptographic security provided for the first communication connection, wherein the generated and/or determined network access configuration data are derived from a context of the first cryptographically protected communication connection such that a security association established in the first cryptographically protected communication connection is used to derive the network access configuration data for the second communication connection, wherein necessary parameters of the second communication connection are locally determined by both the capture device and the network access device without messages being transmitted between the one or more capture devices and the one or more network access device, thereby deriving the necessary parameters from the first cryptographically protected communication connection; and establish the at least further, second communication connection between the capture device and further network access which has been set up in the network access device with the aid of the generated and/or determined network access configuration data, wherein one or more services can be provided via this further, second communication connection of the capture device.

16. The capture device as claimed in claim 15, wherein the cryptographic protection for the first communication connection can be implemented by means of so-called TLS encryption or DTLS encryption.

17. A network access device suitable for providing a service for a capture device within a network arrangement, comprising:

a processor configured to:

generate and/or determine network access configuration data to establish at least one second communication connection, which data have been provided using the cryptographic security provided for at least one first communication connection on or above the transport level of the communication protocol levels which can be used in the network arrangement, wherein the at least first communication connection can be used to monitor data captured by the capture device and/or to control a further device within the network arrangement on the basis of the data captured by the capture device, wherein the generated and/or determined network access configuration data are derived from a context of the first cryptographically protected communication connection such that a security association established in the first cryptographically protected communication connection is used to derive the network access configuration data for the second communication connection, wherein necessary parameters of the second communication connection are locally determined by both the capture device and the network access device without messages being transmitted between the one or more capture devices and the one or more network access device, thereby deriving the necessary parameters from the first cryptographically protected communication connection;

set up at least further network access with the aid of these provided network access configuration data; and establish the at least further, second communication connection between the capture device and the further network access which has been set up with the aid of the provided network access configuration data, wherein one or more services can be provided via this further, second communication connection of the capture device.

18. The network access device as claimed in claim 17, wherein the further network access which has been set up is temporally limited and is no longer available after the time at which the first communication connection is terminated.

19. The network access device as claimed in claim 17, wherein the network access device allows a communication connection to a network service server so that one or more of the services can be provided by the network service server.

20. The network access device as claimed in claim 17, wherein the cryptographic protection for the first communication connection can be implemented by means of TLS encryption or DTLS encryption.

* * * * *